United States Patent
Nicolas et al.

(10) Patent No.: US 10,041,545 B2
(45) Date of Patent: Aug. 7, 2018

(54) BEARING EQUIPPED WITH AN AXIAL DISPLACEMENT DETECTING DEVICE

(71) Applicants: Michel Nicolas, Annay la Côte (FR); Arnaud Guerard, Fontenay-pres-Vezelay (FR)

(72) Inventors: Michel Nicolas, Annay la Côte (FR); Arnaud Guerard, Fontenay-pres-Vezelay (FR)

(73) Assignee: AKTIEBOLAGET SKF, Gothenburg (SE)

(*) Notice: Subject to any disclaimer, the term of this patent is extended or adjusted under 35 U.S.C. 154(b) by 61 days.

(21) Appl. No.: 15/135,632

(22) Filed: Apr. 22, 2016

(65) Prior Publication Data
US 2016/0312835 A1    Oct. 27, 2016

(30) Foreign Application Priority Data
Apr. 24, 2015  (FR) .................... 15 53712

(51) Int. Cl.
| | |
|---|---|
| *G01B 7/30* | (2006.01) |
| *F16C 32/00* | (2006.01) |
| *F16C 41/04* | (2006.01) |
| *F16C 41/00* | (2006.01) |
| *F16C 19/52* | (2006.01) |
| *G01D 5/14* | (2006.01) |
| *G01D 5/244* | (2006.01) |
| *G01M 13/04* | (2006.01) |
| *F16C 43/04* | (2006.01) |

(Continued)

(52) U.S. Cl.
CPC ............ *F16C 41/007* (2013.01); *F16C 19/52* (2013.01); *G01D 5/14* (2013.01); *G01D 5/244* (2013.01); *G01M 13/04* (2013.01); *F16C 17/246* (2013.01); *F16C 19/163* (2013.01); *F16C 43/04* (2013.01); *F16C 2233/00* (2013.01); *F16C 2300/14* (2013.01)

(58) Field of Classification Search
CPC ....................................................... G01B 7/30
USPC .................................................... 324/207.25
See application file for complete search history.

(56) References Cited

U.S. PATENT DOCUMENTS

| | | | |
|---|---|---|---|
| 7,733,083 B2 * | 6/2010 | Ozaki ................ | B60B 27/0005 324/173 |
| 2002/0097040 A1 * | 7/2002 | Takizawa ............... | B60T 8/171 324/174 |
| 2006/0254864 A1 * | 11/2006 | Grigo et al. .................. | 187/393 |

(Continued)

FOREIGN PATENT DOCUMENTS

| | | |
|---|---|---|
| EP | 0530093 A1 | 3/1993 |
| EP | 0814338 A1 | 12/1997 |
| EP | 1653079 A2 | 5/2006 |

OTHER PUBLICATIONS

Translation of EP0530093, Mar. 3, 1993.*

*Primary Examiner* — Bot Ledynh
(74) *Attorney, Agent, or Firm* — Bryan Peckjian; SKF USA Inc. Patent Dept.

(57) ABSTRACT

A bearing providing at least an inner ring and an outer ring adapted to concentrically rotate with respect to one another, equipped with at least one embedded device for the detection of a displacement in translation of the rings relative to each other, the detection device including a linear encoder element mounted on one of the rings, and a sensor element mounted on the other ring and opposite the encoder element.

10 Claims, 3 Drawing Sheets

(51) Int. Cl.
  *F16C 17/24* (2006.01)
  *F16C 19/16* (2006.01)

(56) References Cited

U.S. PATENT DOCUMENTS

2010/0213927 A1\* 8/2010 Mehnert et al. ........... 324/207.2
2012/0013329 A1\* 1/2012 Hattori et al. ........... 324/207.25
2014/0021945 A1\* 1/2014 Omoto .................... 324/207.25

\* cited by examiner

BEARING EQUIPPED WITH AN AXIAL DISPLACEMENT DETECTING DEVICE

CROSS-REVERENCE TO RELATED APPLICATIONS

This application claims priority to French patent application no. 1553712 filed on Apr. 24, 2015, the contents of which are fully incorporated herein by reference.

TECHNICAL FIELD

The present invention relates to the field of bearings, in particular antifriction bearings providing an inner ring, an outer ring and at least one row of rolling elements, such as rollers and/or balls, arranged between the rings. More particularly, the invention relates to the field of large diameter bearings, having to withstand high axial and radial loads, used in machinery and systems comprising slewing bearings with vertical rotation axes.

BACKGROUND OF THE INVENTION

As a result of heavy loads, parts of bearings, which cooperate to transmit loads, in particular the raceways of the rolling elements, wear out. This wear leads to displacements of the rings relative to each other and therefore to relative movements between frame elements to which the bearing rings are mounted. Such movements affect the proper functioning of the bearings, with the risk that the bearing rings or parts of the frame elements come into contact with each other.

Furthermore, it is common to replace the bearings when they are worn out. Such interventions are expensive, especially because of the downtime needed for the machines or facilities. It is therefore desirable that such replacements are made neither too early nor too late.

SUMMARY OF THE INVENTION

One of the objectives of the present invention is to solve the above difficulties.

There is provided a bearing providing at least an inner ring and an outer ring capable of rotating concentrically relative to each other. The bearing is provided with at least one embedded device for the detection of the displacement in translation of the rings relative to each other, this detection device including a linear encoder element mounted on one of the rings, and a sensor element mounted on the other ring and opposite the encoder element.

The encoder element may provide a magnetized strip portion having a track magnetized in axial direction with a succession of positive and negative poles.

The strip portion can be inserted in a sealed support attached onto the corresponding ring.

The sealed support can be inserted into a recess of the corresponding ring.

The sealed support may include a frame covered with a film.

The detection means may comprise a control unit connected to the sensor element and embedded in the corresponding ring.

The control unit may include a display.

The sensor element can be installed in a radial passage of the corresponding ring.

The sensor element can be mounted radially adjustable in the radial passage.

The control unit may be accommodated within a recess provided in the ring which carries it. Suitably, the recess is provided at a radially opposite side of the ring with respect to the encoder element and is in communication with the radial passage that accommodates the sensor element.

BRIEF DESCRIPTION OF THE DRAWINGS

A bearing according to the present invention will now be described by way of non-limiting example, illustrated by the drawing, in which.

DETAILED DESCRIPTION OF THE INVENTION

Figure 1:
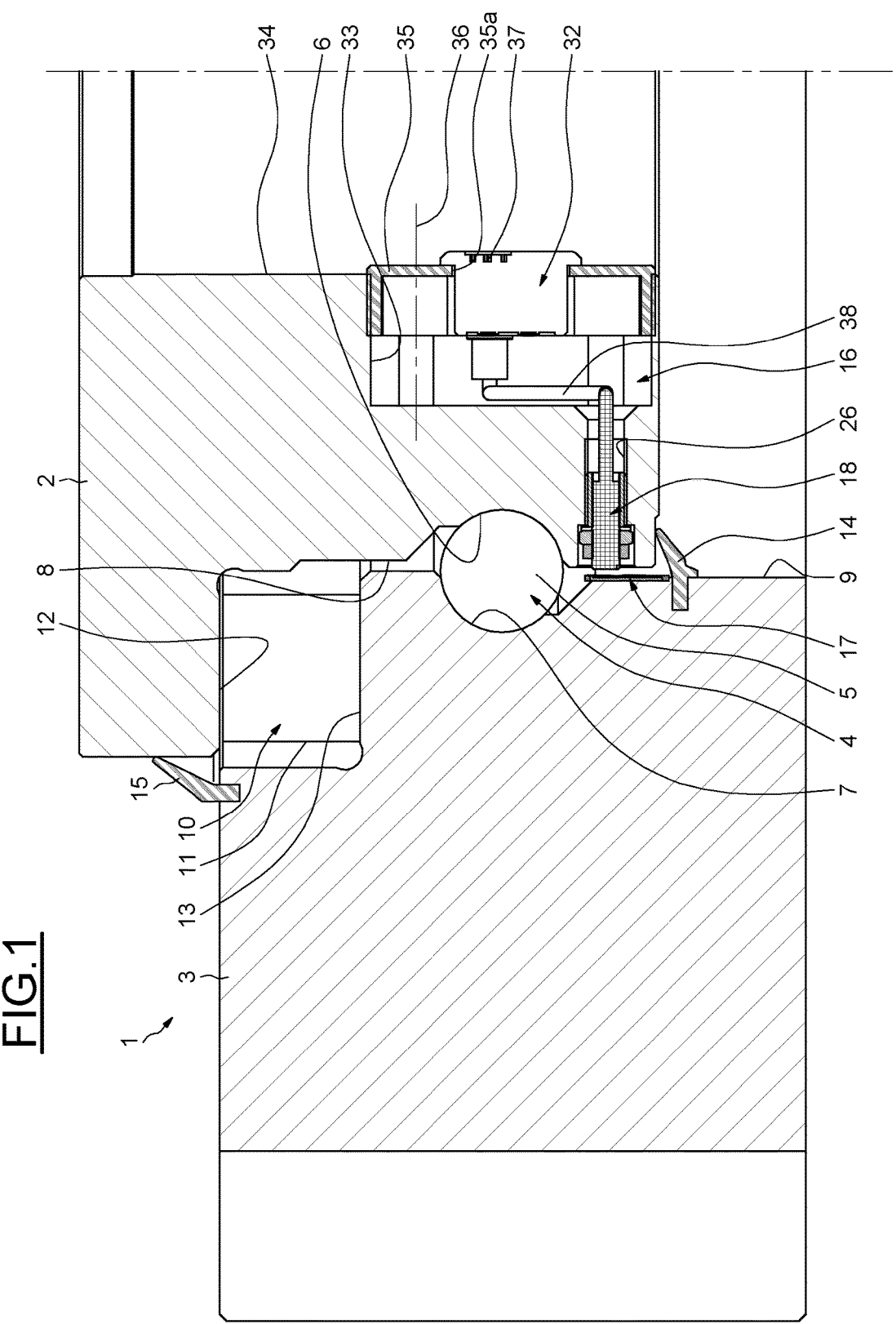
FIG. 1 shows a partial axial cross-sectional view of a rolling element bearing equipped with a device for detecting displacement in axial direction.

As illustrated in FIG. 1, a rolling element bearing 1 provides an inner ring 2 and an outer ring 3 concentrically disposed about an axis of rotation (not shown) which will be considered by way of example as being in a vertical position. The bearing rings 2 and 3 are intended to be fixed on respective frame elements (not shown) to permit rotation of one frame element relative to the other and transmit loads therebetween.

For supporting radial loads, the rolling element bearing 1 includes, for example, a row 4 of rolling elements 5, such as balls, rolling on opposing annular raceways 6 and 7 provided as grooves in the respective cylindrical faces 8 and 9 of the inner ring 2 and the outer ring 3.

For supporting the axial loads, the rolling element bearing 1 includes, for example, a row 10 of rolling elements 11, such as rollers, rolling on opposing axially oriented raceways 12 and 13 of the inner ring 2 and the outer ring 3 respectively. The axially oriented raceway 12 of the inner ring 2 is located axially outwardly of the rollers 11, so that forces acting on the inner ring in a downward direct are transferred to the outer ring 3 via the row 10 of rollers 11.

The annular space between the rings 2 and 3, in which the rows 4 and 10 of rolling elements 5 and 11 are accommodated, is sealed by means of annular seals 14 and 15 provided at opposite axial end regions of this annular space. In the depicted example, the seal 14 is mounted to the outer ring 3 axially outward of the row 4 of rolling elements 5, while the seal 15 is mounted to the outer ring axially outward of the row 10 of rolling elements 11.

The rolling element bearing 1 is equipped with an embedded device 16 for the detection of a relative displacement between the bearing rings 2 and 3. In the example shown, this detection device 14 is adapted to detect axial displacements of one ring 2 relative to the other 3, that is to say in the direction of the axis of rotation of the bearing 1.

The detection device 16 includes a linear encoder element 17 which is carried by the outer ring 3 and a sensor element 18 which is carried by the inner ring 2. The sensor element 18 is arranged so as to face towards the encoder element 17, and is responsive to the encoder element 17.

The encoder element 17 is arranged in the annular space between the bearing rings 2 and 3, in which the rows 4 and 10 of rolling elements 5 and 11 are accommodated, and the sensor element 18 opens into this annular space.

Figure 2:
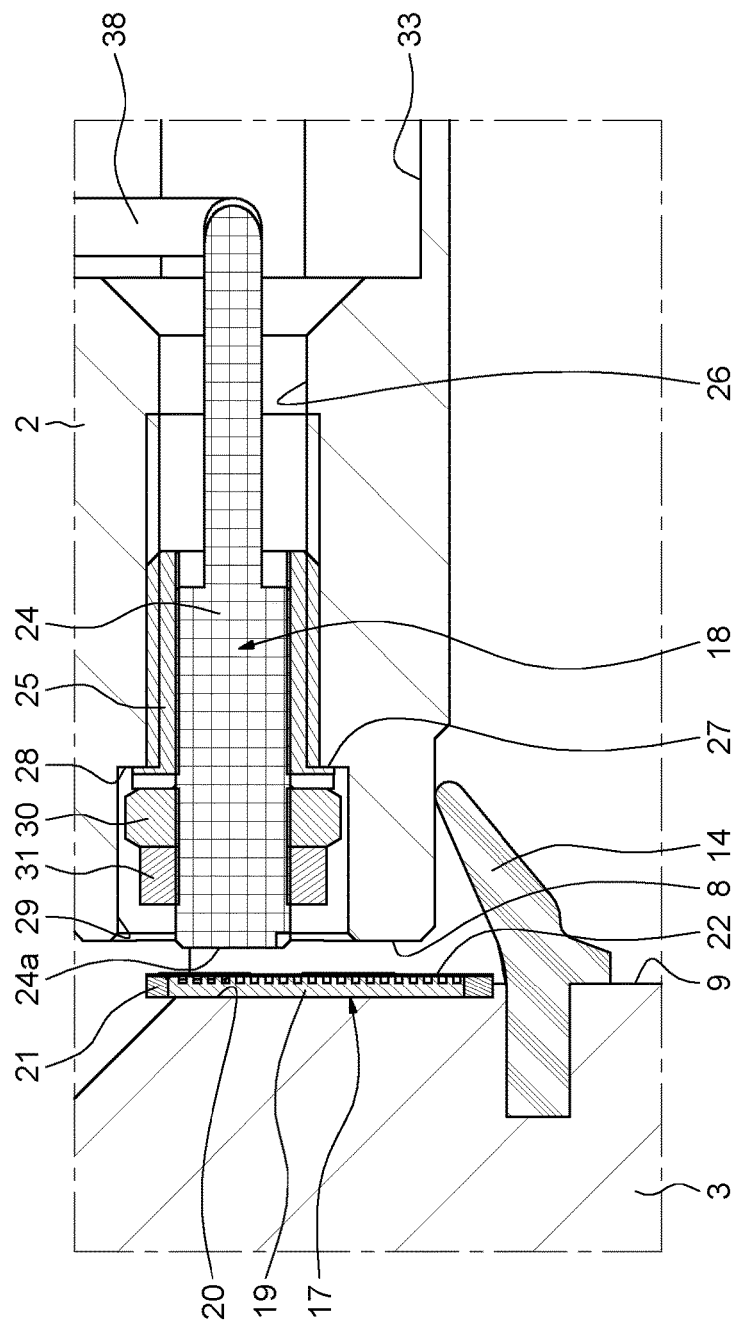
FIG. 2 shows an enlarged axial cross-section of the detecting device of FIG. 1.
Figure 3:
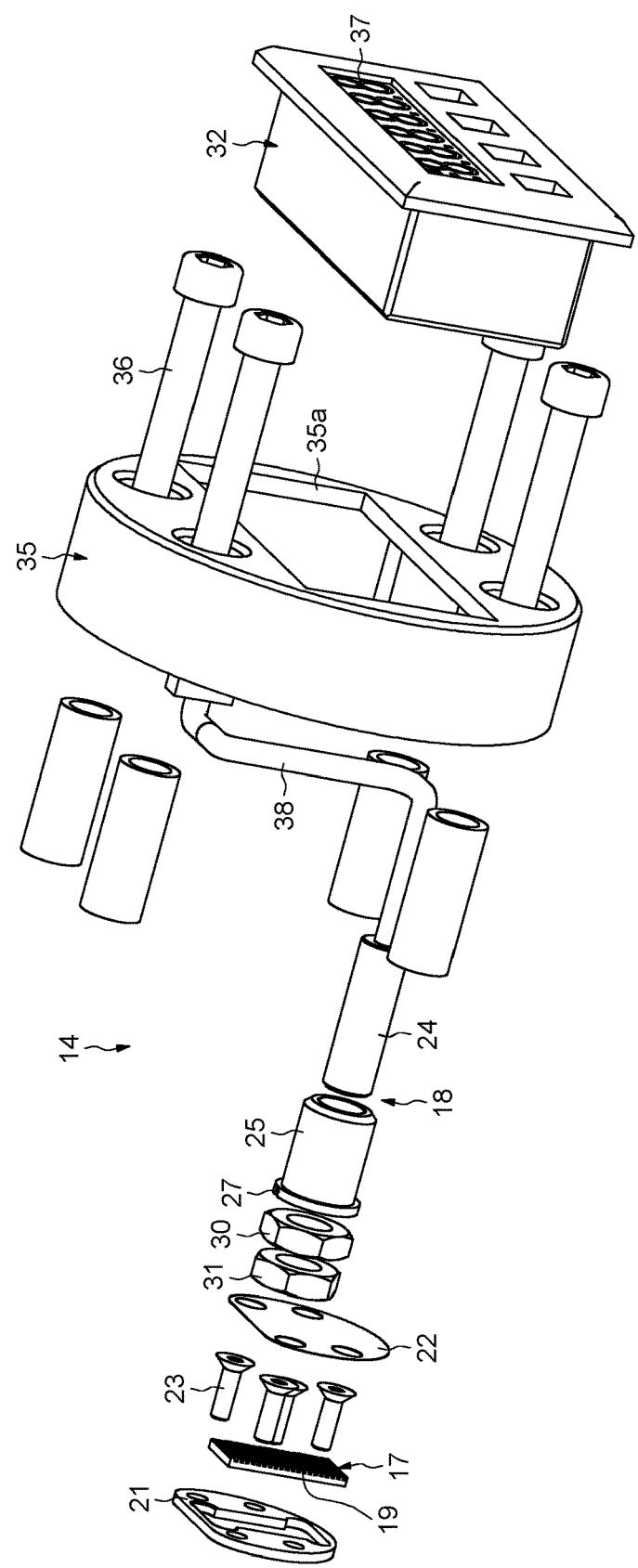
FIG. 3 shows an exploded perspective view of the detection device mentioned above.

As illustrated more specifically in FIGS. 2 and 3, the encoder element 17 includes a linear strip portion 19 which is attached in a flat manner, for example by means of an adhesive layer, against the bottom of a recess 20 in the cylindrical inner surface 9 of the outer ring 3, in an area between the row 4 of rolling elements 5 and the seal 14.

The linear strip portion 19 is surrounded by a frame 21 resting on the bottom of the recess 20. This frame 21 is covered with a film 22, which also covers the linear strip portion 19. The frame 21 and the film 22 are penetrated by fixing screws 23, for example of the recessed head type, screwed into the outer ring 3.

Thus, the linear strip portion 19 is accommodated within a sealed cavity.

According to another embodiment, the linear strip portion 19 is bonded to the bottom of a cavity formed in a flat support, which is then covered with a film. The support and film are then mounted flat in the recess 20 and secured with screws.

The linear strip portion 19 constituting the encoder element 17 is magnetized and provides an incremental code track which is magnetically encoded in axial direction via a succession of positive and negative poles.

The sensor element 18 has a cylindrical portion 24 which is screwed into a sleeve 25, the latter being screwed into a radial passage 26 of the inner ring 2.

The sleeve has an annular shoulder 27 bearing against an annular shoulder 28 formed by the bottom of a counterbore 29 in the radial passage 26 that extends from the outer cylindrical surface 8 of the inner ring 2. The radial passage 26 opens into the annular space between the rings 2 and 3, where the rows 4 and 10 rows of rolling elements 5 and 11 are accommodated, through the cylindrical outer surface 8 of the inner ring 2.

So as to maintain the cylindrical portion 24 of the sensor element 18 in a desired radial position of adjustment in which its end 24a is at a predetermined distance from the encoder element 17, the cylindrical portion 24 is provided in the counterbore 29 with a nut 30 which bears against the sleeve 25, and a locknut 31 which bears against the nut 30.

As illustrated in FIGS. 1 and 3, the detection device 14 further provides a control unit 32 which is mounted on the inner ring 2. More specifically, the inner ring 2 has a recess 33 formed in the inner cylindrical surface 34 of the inner ring 2, into which the radial passage 26 opens. The control unit 32 is embedded in a leaktight fashion in an opening 35a of an intermediate bracket 35 which is clamped sealingly in the recess 33 and fixed to the inner ring 2 by screws 36.

The control unit 32 is connected to the sensor element 18 via electrical connection wires 38 running within the recess 33, below and/or through the bracket 35 and/or below the housing of the control unit 32.

The control unit 32 contains an electronic circuit (not shown) and a power supply battery (not shown), the electronic circuit being adapted to analyze the signals from the sensor element 18 and to output a value on a display 37.

Upon relative rotation of the bearing rings 2 and 3, the aforementioned raceways, on which the rolling elements 5 and 11 of rows 4 and 10 roll, are subject to wear. This results in a downward displacement of the inner ring 2 relative to the outer ring 3, along the axis of rotation, and a corresponding displacement in axial direction of the sensor element 18 relative to the encoder element 17.

The sensor element 18 delivers electrical signals to the control unit 32, which correspond to the magnetic encoding of the incremental coding track of the linear strip portion 19 of the encoder element 17.

The electronic circuit of the control unit 32 calculates the corresponding value of the axial displacement or the corresponding vertical position, with reference to a vertical position of origin of the inner ring 2 relative to the outer ring 3, and delivers this value to the display 37, such that a user can read this value and be informed of the bearing wear.

When the displayed value reaches a predetermined threshold, the user, who reports this value, is then informed that the bearing 1 has reached a predetermined wear so that it is appropriate to replace the bearing 1.

According to another embodiment, this predetermined threshold of wear of the bearing 1 can be programmed in the electronic circuit of the control unit 32, so that the latter supplies a specific light or audible signal when this wear threshold is reached, e.g. by illuminating a specific diode or by a blinking of the displayed value.

According to another embodiment, the value of wear of the bearing 1 can be transmitted to a remote display, for example by wire or by wireless transmission. Suitably, the electronic circuit of the control unit 32 may be equipped with a radio transmitter for this purpose.

In the description above, the rolling element bearing provides two rows of rolling elements. However, the present invention can be applied to a rolling element bearing providing at least one row of rolling elements. The invention can also be applied to a bearing without rolling elements interposed between the rings, for example a plain bearing or a ball joint.

The invention claimed is:

1. A bearing comprising:
an inner ring that viewed in cross section has a radially outer cylindrical surface on which is positioned a first annular raceway, a first shoulder extending radially outwardly from the radially outer cylindrical surface to form a first radially extending axial surface on which is located a first raceway, wherein the first annular raceway and the first raceway are oriented perpendicularly to each other, and
an outer ring adapted to concentrically rotate with respect to the inner ring and when viewed in cross section having a radially inner surface on which a second annular raceway is positioned, a second shoulder extends radially outwardly from the radially inner surface to form a second radially extending axial surface on which is located a second raceway, wherein the second annular raceway and the second raceway are oriented perpendicularly to each other,
the first raceway and the second raceway facing each other a and defining a first annular space for a first set of rolling elements such that axial forces are transmitted between the inner ring and the outer ring, the first annular raceway and the second annular raceway facing each other defining a second annular space for a second set of rolling elements such that radial forces are transmitted between the inner ring and the outer ring,
the first and second annular spaces being in fluid communication therebetween and, taken together, are sealed from an exterior of the bearing, the bearing being equipped with at least one embedded device for the detection of an axial displacement between the rings, the detection device including a linear encoder element mounted on one of the rings, and a sensor element mounted on the other ring and facing the encoder element such that relative axial movement between the inner ring and the outer ring is measurable, the sensor element not axially overlapping the linear encoder element.

2. The bearing according to claim 1, wherein the encoder element further comprises a magnetized strip portion having a track coded in an axial direction by a succession of positive and negative poles.

3. The bearing according to claim 2, wherein the strip portion is disposed within a sealed support fixed to the corresponding ring.

4. The bearing according to claim 3, wherein the sealed support is inserted into a recess of the corresponding ring.

5. The bearing according to claim 3, wherein the sealed support further comprises a frame covered by a film.

6. The bearing according to claim 1, wherein the embedded device further comprises a control unit connected to the sensor element and embedded in the ring to which the sensor element is mounted.

7. The bearing according to claim 6, wherein the control unit further comprises a display.

8. The bearing according to claim 1, wherein the sensor element is mounted in a radial passage of the corresponding ring.

9. The bearing according to claim 8, wherein the sensor element is mounted in the radial passage such that its position in the radial direction is adjustable.

10. The bearing according to claim 8, wherein the embedded device further comprises a control unit connected to the sensor element mounted in the radial passage, wherein the control unit is disposed within a recess, and wherein the recess is in communication with the radial passage.

* * * * *